United States Patent
Thiveos

(10) Patent No.: US 7,248,976 B2
(45) Date of Patent: Jul. 24, 2007

(54) METHOD AND SYSTEM FOR THE VALIDATION OF FAULT SYMPTOMS

(75) Inventor: Konstantin Thiveos, Murnau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/566,560

(22) PCT Filed: Jul. 16, 2004

(86) PCT No.: PCT/EP2004/051528

§ 371 (c)(1),
(2), (4) Date: Feb. 21, 2006

(87) PCT Pub. No.: WO2005/013132

PCT Pub. Date: Feb. 10, 2005

(65) Prior Publication Data

US 2006/0229829 A1    Oct. 12, 2006

(30) Foreign Application Priority Data

Jul. 31, 2003 (DE) .............................. 103 35 151

(51) Int. Cl.
*G01R 31/00* (2006.01)

(52) U.S. Cl. ........................................ 702/59

(58) Field of Classification Search .................. 702/59, 702/182–185
See application file for complete search history.

(56) References Cited

U.S. PATENT DOCUMENTS 5,937,366 A    8/1999   Zbytniewski et al. ....... 702/108

FOREIGN PATENT DOCUMENTS

JP    2-39397    2/1990

OTHER PUBLICATIONS

Hölscher, et al.: "Microcomputer in der Sicherheitstechnik", Verlag TÜV Rheinland GmbH, Köln, Germany, 1984, ISBN 3-55585-180-6, pp. 5-1 to 5-3 and English translation thereof.

*Primary Examiner*—Michael Nghiem
(74) *Attorney, Agent, or Firm*—Laurence A. Greenberg; Werner H. Stemer; Ralph E. Locher

(57) ABSTRACT

For the purpose of validating fault symptoms appearing at driver outputs, a symptom validation unit is provided, within a final stage, which undertakes a validation or a preliminary validation, as applicable, on the basis of a classification of symptoms. By assigning the item of validation data "invalid" to symptoms which cannot be unambiguously identified, it is possible to suppress the further consideration of the symptoms, or to initiate further diagnoses of the final stage output concerned, as appropriate.

12 Claims, 2 Drawing Sheets

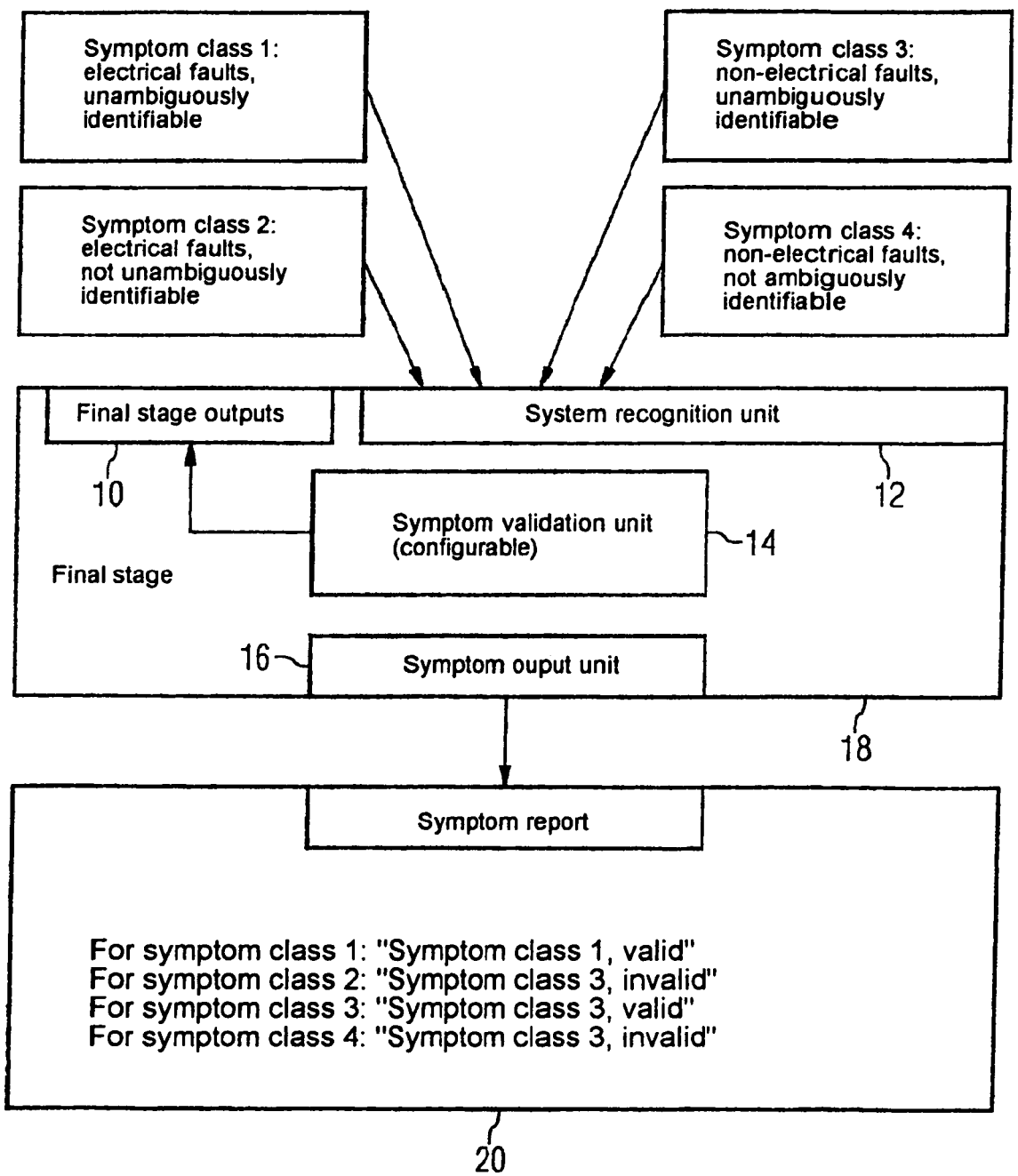

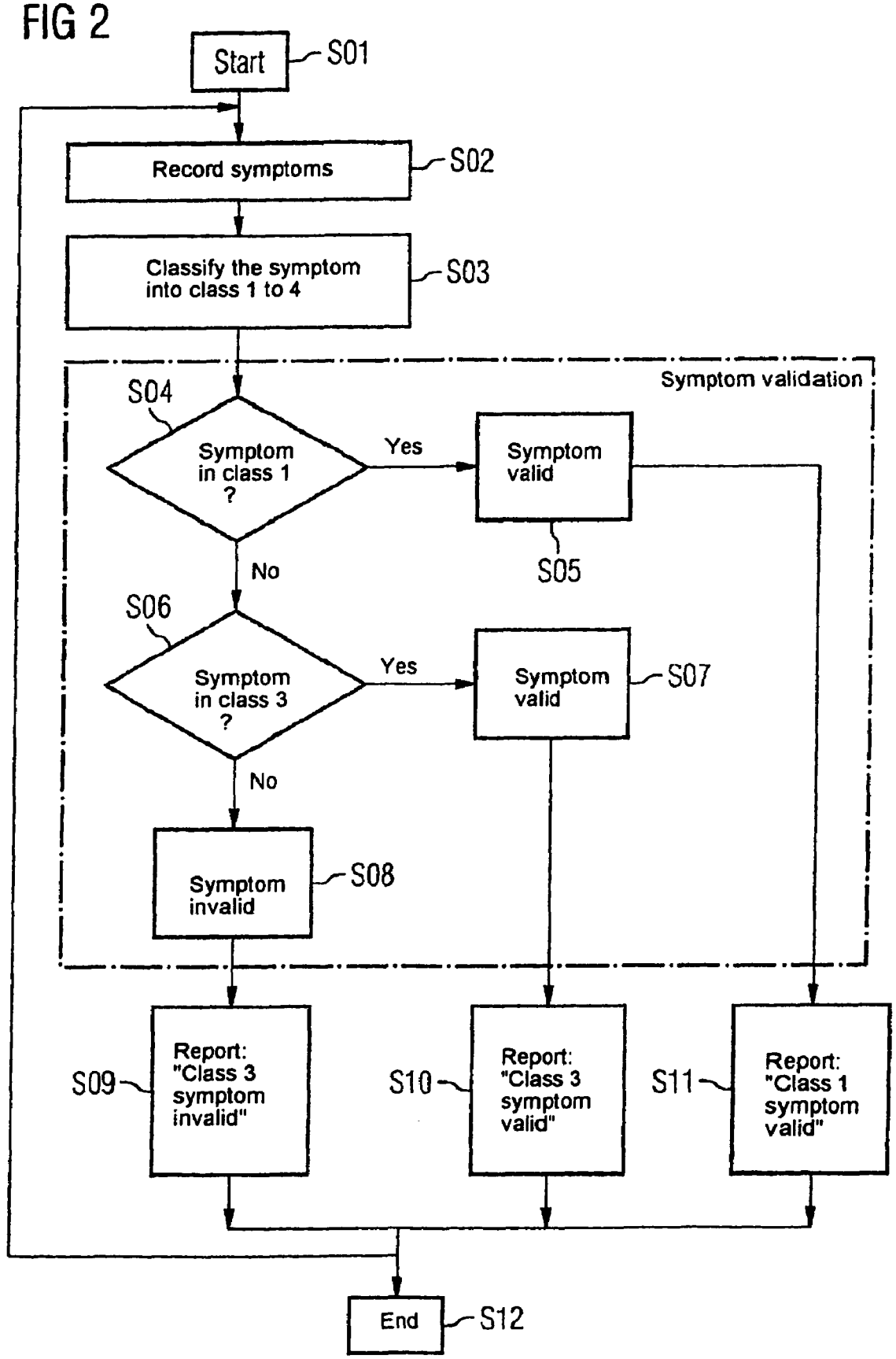

METHOD AND SYSTEM FOR THE VALIDATION OF FAULT SYMPTOMS

BACKGROUND OF THE INVENTION

Field of the Invention

The invention relates to a method for the validation of fault symptoms appearing at driver outputs.

The invention relates further to a system for the validation of fault symptoms appearing at driver outputs.

The monitoring of final stage driver outputs in the context of fault diagnosis during the operation of a motor vehicle is familiar. When this is done, circuit states can arise in which fault symptoms are not identified, or not unambiguously. For these fault symptoms, a validation routine is generally performed, by which to check the validity of the reported fault symptom. This approach is intended, for example, to ensure that a fault counter which has been incremented because of a valid fault symptom is not then decremented again by consideration of an unvalidated item of data which implies that the fault is no longer present.

SUMMARY OF THE INVENTION

The performance of validation routines of this type involves a high computational effort. In some circumstances this effort can be unreasonable, for example if it is only a matter of freezing a fault counter at a certain counter reading.

The object underlying the invention is to provide a method and a system by which the performance of a validation routine for a symptom which is not identified, or not unambiguously identified, is rendered superfluous in many cases.

This object is achieved with the features of the independent claims.

Advantageous forms of embodiment of the invention are specified in the dependent claims.

The method according to the invention for the validation of fault symptoms appearing at driver outputs includes the steps: record a symptom present at a driver output, and classify the symptom into one of several classes of different symptoms, by means of a symptom recognition unit; assign an item of symptom validation data to the symptom, as a function of the classification, by means of a symptom validation unit; report the classification, or an item of reporting data assigned to the classification, as applicable; and report the symptom validation data. On the basis of this method it is possible to carry out symptom validation solely on the basis of a classification of fault symptoms. A validation of this type is in many cases sufficient, or it can be effected as a preliminary validation before carrying out further validation measures.

It is particularly useful if at least four classes are available for the purposes of classifying a symptom, whereby an unambiguously identifiable electrical fault is classified as a symptom of class 1, an electrical fault which is not unambiguously identifiable is classified as a symptom of class 2, a symptom is classified as belonging to class 3 if it can be unambiguously identified that no electrical fault is present, and a symptom is classified as belonging to class 4 if no electrical fault is present but this cannot be unambiguously identified. Such a classification offers an adequate basis for the validation of symptoms according to the invention. In this sense, an item of validation data can be unambiguously assigned to each of the classes 1 to 4.

In doing this, provision is made in particular that when a fault symptom is classified as belonging to class 1, the item of validation data assigned to the fault symptom is "valid", and the classification is reported together with the validation data. A fault symptom in class 1 is an electrical fault which can be unambiguously identified. Such fault symptoms are always given the item of validation data "valid" and can thus form the prerequisite, for example, for a fault counter to be incremented.

It is useful if provision is also made that, when a fault symptom is classified as belonging to class 3, the item of validation data "valid" is assigned to the fault symptom and the classification is reported together with the validation data. The classification as class 3 specifies that there is no electrical fault present and that this can be unambiguously identified. The item of validation data "valid" can be assigned.

In this sense, a further preferable provision is that if a fault symptom is classified as belonging to class 2 or class 4, the item of validation data "invalid" is assigned to the fault symptom, and the classification as class 3 and the item of validation data are reported. Consequently fault symptoms in class 2, that is to say electrical faults which cannot be unambiguously identified, or in class 4, that is faults not present but where this cannot be unambiguously identified, are given the item of validation data "invalid" and there is a general report that a fault symptom in class 3 is present.

In this connection it can be useful when an item of validation data "invalid" is present if there is a possibility of getting the symptom validation unit to influence the driver output concerned, in order to get at additional data about the fault symptom concerned. Even if the assignment of the item of validation data "invalid" to the fault symptoms in class 2 and class 4 is sufficient, for example, to avoid the decrementing of a fault counter when a fault symptom in class 4 is present, it can be desirable to obtain further data about the fault. In this case, the symptom validation unit can, for example, be prompted by system components located outside the final stage to supply pulses to the final stage outputs, as a basis to enable a further diagnosis of the final stage outputs to be undertaken.

The invention relates further to a system with a final stage and a symptom reporting unit assigned to the final stage, where the final stage has a symptom recognition unit, a symptom validation unit and a symptom output unit, by means of the symptom recognition unit symptoms, present at a driver output, can be recorded and in each case classified into one of several classes of different symptoms, by means of the symptom validation unit an item of symptom validation data which depends on the classification can be assigned to a symptom, by means of the system output unit the classification and the item of validation data can be communicated to the symptom reporting unit, and the symptom reporting unit reports the classification or an item of reporting data assigned to the classification, as applicable, and the symptom validation data. In this way, the advantages and special features of the method according to the invention can also be realized as part of a system. This applies also to the specially preferred forms of embodiment of the system according to the invention, specified below.

This is further developed in a useful way in that at least four classes are available for the classification of a symptom, whereby an unambiguously identifiable electrical fault is classified as a symptom of class 1, an electrical fault which is not unambiguously identifiable is classified as a symptom of class 2, a symptom is classified as belonging to class 3 if it can be unambiguously identified that no electrical fault is present, and a symptom is classified as belonging to class 4 if no electrical fault is present but this cannot be unambiguously identified.

The further provision is made that, when a fault symptom is classified as belonging to class 1, the item of validation data "valid" is assigned to the fault symptom and the classification is reported together with the validation data.

The system according to the invention is developed in a particularly preferred manner in that when a fault symptom is classified as belonging to class 3, the item of validation data "valid" is assigned to the fault symptom and the classification is reported together with the validation data.

It is, furthermore, of particular advantage that, if a fault symptom is classified as belonging to class 2 or class 4, the item of validation data "invalid" is assigned to the fault symptom and the report shows the classification as class 3 and the item of validation data.

It is also useful, as part of the system according to the invention, to make provision that when the item of validation data is "invalid" there is a possibility for getting the symptom validation unit to influence the driver output concerned, in order to get at additional items of data about the fault symptom concerned.

The invention is based on the recognition that a symptom validation unit, which is assigned to the final stage and which works on the basis of a classification of faults, renders unnecessary in respect of certain functions the performance of validation routines for fault symptoms which are not identified or not unambiguous.

The invention will now be explained by reference to examples of preferred forms of embodiment and the accompanying drawings, in which;

BRIEF DESCRIPTION OF THE DRAWINGS

FIG. 1 shows a schematic representation of a system according to the invention; and FIG. 2 shows a flow diagram for a method according to the invention.

DESCRIPTION OF THE PREFERRED EMBODIMENTS

FIG. 1 shows a schematic representation of a system according to the invention. Symptoms in various classes can be present. Symptoms in class 1 derive from electrical faults which are unambiguously identifiable. Symptoms in class 2 derive from electrical faults which are not unambiguously identifiable. In the case of symptoms in class 3 it is possible to identify unambiguously that no electrical fault is present. In the case of symptoms in class 4, no electrical fault is present, but this cannot be unambiguously identified. A symptom recognition unit 12 assigned to a final stage 18 records the symptoms present at the final stage outputs 10 and classifies them by assignment to the listed classes 1 to 4. On the basis of this classification, a symptom validation unit 14 undertakes the assignment of an item of symptom validation data. The items of data which are thus present are output by a symptom output unit 16 on a symptom reporter 20. In the case of a symptom in class 1, the output from the symptom reporter is that the symptom belongs to class 1 and has the item of validation data "valid". In the case of a symptom in class 2 the output is that the symptom belongs to class 3 and is "invalid". If a symptom in class 3 is present, the report is that the symptom belongs to class 3 and is "valid". If a symptom in class 4 is present, the symptom reporter 20 specifies that the symptom belongs to class 3 and is "invalid". If necessary, in addition to the validation which is then available, is it possible to request the symptom validation unit 14 to apply pulses to the final stage outputs 10 so that a further diagnosis of the final stage outputs can be carried out, in particular in relation to symptoms in classes 2 and 4. The symptom validation unit 14 can be designed to be configurable, so as to permit various strategies for the influences applied to the final stage outputs 10. Provision can be made, for example, for the symptom validation unit 14 itself to initiate the influence on the final stage outputs. Provision can also be made for other system components to request the symptom validation unit 14 to supply pulses to the final stage 10. In order to permit various of these variants, it is beneficial if the symptom validation unit 14, which will preferably be realized in hardware form, is configurable.

FIG. 2 shows a flow diagram for a method according to the invention. After the start of the method, in step S01, in step S02 a symptom is recorded by the symptom recognition unit, at a final stage output of a final stage. In step S03, the symptom is classified as belonging to one of the classes 1 to 4. As part of the symptom validation, step S04 asks whether a symptom in class 1 is present. If so, then in step S05 the item of validation data "valid" is assigned to the symptom. If no symptom in class 1 is present, then step S06 asks whether a symptom in class 3 is present. If so, then in step S07 the item of validation data "valid" is in turn assigned to the symptom. If step S06 determines that no symptom in class 3 is present, then at this point in the execution of the method it has been shown that a symptom in class 2 or class 4 is present, so that the item of validation data "invalid" can immediately be assigned to the symptom in step S08. After the symptom validation, the data which has been determined is handed over, this not being shown in the present flow diagram, to a symptom reporter, so that following on from step S08 the report "Symptom class 3, invalid" is made, as shown in step S09. After step S07 the report "Symptom class 3, valid" is made, as shown in step S10, and after step S05 the report "Symptom class 1, valid" is made, as shown in step S11. A return to the recording of symptoms in step S02 permits the method according to the invention to be executed again, or the method can terminate in step S12, as applicable.

The invention can be summarized as follows: for the purpose of validating fault symptoms arising at driver outputs 10 a symptom validation unit 14 is provided, within a final stage 18, which carries out a validation or a preliminary validation on the basis of a classification of symptoms. By the assignment of the item of validation data "invalid" to symptoms which are not unambiguously identifiable, it is possible to suppress further consideration of the symptoms, or to initiate further diagnoses for the final stage output 10 concerned, as appropriate.

I claim:

1. A method of validating fault symptoms appearing at driver outputs, which comprises the following steps:

recording a symptom, present at a driver output, and classifying the symptom into one of several classes of different symptoms by way of a symptom recognition unit;

with a symptom validation unit, assigning to the symptom an item of symptom validation data of "valid" or "invalid" in dependence on a classification resulting from the classifying step;

if the symptom validation item is "valid," reporting a classification that is valid, or if the symptom validation item is "invalid," reporting a classification that is invalid; and reporting the item of symptom validation data.

2. The method according to claim 1, which comprises:

providing at least four classes for classifying a symptom;

classifying an unambiguously identifiable electrical fault as a symptom in class 1;

classifying a not unambiguously identifiable electrical fault as a symptom in class 2;

classifying a symptom as belonging to class 3 if an unambiguous determination is possible that no electrical fault is present; and classifying a symptom as belonging to class 4 if no electrical fault is present, but the absence of the electrical fault cannot be unambiguously identified.

3. The method according to claim 2, which comprises, if a fault symptom is classified as belonging to class 1, assigning the item of validation data "valid" to the fault symptom and reporting the classification together with the item of validation data.

4. The method according to claim 2, which comprises, if a fault symptom is classified as belonging to class 3, assigning the item of validation data "valid" to the fault symptom and reporting the classification together with the item of validation data.

5. The method according to claim 2, which comprises, if a fault symptom is classified as belonging to class 2 or class 4, assigning the item of validation data "invalid" to the fault symptom and reporting the classification as class 3 together with the item of validation data.

6. The method according to claim 1, which comprises, if the item of validation data is reported as "invalid", causing the symptom validation unit to influence the respective driver output in order to acquire additional data about the fault symptom concerned.

7. A system for assigning an information item "valid" or "invalid" to fault symptoms appearing at a driver output, comprising:

a final stage including a symptom recognition unit with a symptom validation unit and a symptom output unit;

said symptom recognition unit recording symptoms present at the driver output and classifying each symptom into one of several classes of different symptoms;

said symptom validation unit being configured to assign to a symptom an item of symptom validation data of "valid" or "invalid" in dependence on a classification by said symptom recognition unit;

a symptom reporting unit connected to said final stage and to receive from said system output unit the classification and the item of validation data, and configured to report, if the information item "valid" is assigned, a classification that is valid and the symptom validation information, or, if the information item "invalid" is assigned, a classification that is invalid and the item of symptom validation data.

8. The system according to claim 7, wherein at least four classes are available for classifying a symptom, including class 1, class 2, class 3, and class 4, and wherein:

an unambiguously identifiable electrical fault is classified as a symptom in class 1;

a not unambiguously identifiable electrical fault is classified as a symptom in class 2;

a symptom is classified as belonging to class 3 if an unambiguous determination is possible that no electrical fault is present; and a symptom is classified as belonging to class 4 if no electrical fault is present, but an absence of an electrical fault cannot be unambiguously identified.

9. The system according to claim 8, wherein, if a fault symptom is classified as belonging to class 1, said symptom validation unit assigns the item of validation data "valid" to the fault symptom and said symptom reporting unit reports the classification together with the item of validation data.

10. The system according to claim 8, wherein, if a fault symptom is classified as belonging to class 3, said symptom validation unit assigns the item of validation data "valid" to the fault symptom and said symptom reporting unit reports the classification together with the item of validation data.

11. The system according to claim 8, wherein, if a fault symptom is classified as belonging to class 2 or class 4, said symptom validation unit assigns the item of validation data "invalid" to the fault symptom, and said symptom reporting unit reports a class 3 classification together with the item of validation data.

12. The method according to claim 7, which comprises, when the item of validation data is reported as "invalid", said symptom validation unit is caused to influence the respective driver output in order to acquire additional data about the fault symptom concerned.

* * * * *